United States Patent [19]
Nakatani et al.

[11] Patent Number: 5,465,089
[45] Date of Patent: Nov. 7, 1995

[54] METHOD AND APPARATUS FOR GUIDANCE OF ROAD CONDITION

[75] Inventors: Yasuhiro Nakatani; Atsushi Ichimura; Toshio Tanaka, all of Kobe; Hiroshi Takeuchi, Nishinomiya; Yoichi Okano, Kobe, all of Japan

[73] Assignee: Fujitsu Ten Limited, Kobe, Japan

[21] Appl. No.: 356,049

[22] Filed: Dec. 14, 1994

Related U.S. Application Data

[63] Continuation of Ser. No. 123,198, Sep. 20, 1993, abandoned, which is a continuation of Ser. No. 794,225, Nov. 19, 1991, abandoned.

[30] Foreign Application Priority Data

Nov. 20, 1990 [JP] Japan ..................... 2-312798

[51] Int. Cl.$^6$ ................................. G08G 1/123
[52] U.S. Cl. .................. 340/995; 340/988; 364/444; 364/449
[58] Field of Search ................. 340/995, 990, 340/988, 905; 364/444, 449, 443, 450; 73/178 R; 342/451

[56] References Cited

U.S. PATENT DOCUMENTS

| | | | |
|---|---|---|---|
| 4,937,570 | 6/1990 | Matsukawa et al. | 340/995 |
| 4,951,211 | 8/1990 | De Villeroche | 340/995 |
| 5,003,306 | 3/1991 | Takahashi et al. | 340/990 |
| 5,067,082 | 11/1991 | Nimura et al. | 340/988 |
| 5,109,344 | 4/1992 | Kakihara et al. | 340/990 |
| 5,121,326 | 6/1992 | Moroto et al. | 340/995 |
| 5,146,219 | 9/1992 | Zechnall | 340/995 |
| 5,168,452 | 12/1992 | Yamada et al. | 340/995 |
| 5,184,123 | 2/1993 | Bremer et al. | 340/988 |

FOREIGN PATENT DOCUMENTS

| | | |
|---|---|---|
| 2628243 | 9/1989 | France . |
| 3322195 | 1/1985 | Germany . |
| 0295912 | 12/1928 | Japan ..................... 340/995 |
| 63-20700 | 1/1988 | Japan . |
| 63-208713 | 8/1988 | Japan . |
| 1-195315 | 8/1989 | Japan . |
| 88/04029 | 6/1988 | WIPO . |

OTHER PUBLICATIONS

*Patent Abstracts of Japan*, vol. 12, No. 499; p. 807; Dec. 27, 1993; & JP-A-63 208 713 (Navigation System; Sanyo Electric Co.) Aug. 30, 1988 (abstract only).

Primary Examiner—Brent Swarthout
Assistant Examiner—Nina Tong
Attorney, Agent, or Firm—Staas & Halsey

[57] ABSTRACT

A method and an apparatus for guidance of a road condition for providing prospective information concerning a configuration of a forthcoming curve or intersection on a traveling route for ensuring safe driving, particularly in the dark or roads such as winding roads, mountainous roads and so forth. The apparatus includes a detecting circuit for detecting a traveling link among a plurality of links in road information on which a vehicle is traveling; a circuit for detecting an instantaneous position of the vehicle and a traveling direction of the vehicle; and a circuit for calculating a distance from the instantaneous vehicle position to a forthcoming end of the traveling link on the basis of the instantaneous vehicle position and the traveling direction. In addition, the apparatus includes a circuit for detecting a number of intersecting links connected to the forthcoming end of the traveling link; a circuit for calculating an intersecting angle at the forthcoming end of the traveling link with the intersecting links, and a circuit for displaying information concerning curvature at the intersection of the links.

14 Claims, 5 Drawing Sheets

METHOD AND APPARATUS FOR GUIDANCE OF ROAD CONDITION

This application is a continuation, of application Ser. No. 08/123,198, filed Sep. 20, 1993, now abandoned, which is a continuation of application Ser. No. 07/794,225, filed Nov. 19, 1991, abandoned.

BACKGROUND OF THE INVENTION

1. Field of the Invention

The present invention relates to a method and apparatus for providing guidance concerning a road condition, such as road configuration (e.g. shape of oncoming road), on a traveling route of a vehicle.

2. Description of the Related Art

Conventionally, automotive navigation systems have been available for showing the driver a position of a vehicle on a road map. Such navigation systems enable the driver to confirm the location of the vehicle.

For vehicular drivers, the radius of curves, configuration of intersections and related information concerning configuration of the road is important. Particularly, information concerning the configuration of the road is important for driving in the dark. Such information may be obtained through navigation systems. However, on the other hand, it is impractical and even dangerous to frequently observe the display screen of a navigation system for checking the road condition while driving. Therefore, it is desired to provide information of the road condition appropriately and safely. However, the navigation systems now available, are not satisfactory for safely providing the necessary information, such as road configuration.

SUMMARY OF THE INVENTION

Therefore, it is an object of the present invention to improve the drawbacks in the prior art and provide useful guidance to a vehicular driver in a safe and appropriate manner.

Another object of the present invention is to provide a method and an apparatus that can effectively provide information for a vehicular driver concerning a configuration of a road, such as the radius of a forthcoming curve, configuration of a forthcoming intersection and so forth.

According to one aspect of the invention, an apparatus for providing guidance concerning road condition comprises:

means for detecting a unit traveling link among a plurality of links, forming a link train, in a road information on which a vehicle is traveling;

means for detecting an instantaneous position of the vehicle and a traveling direction of said vehicle;

means for calculating a distance from the instantaneous vehicle position to a forthcoming end of said unit traveling link on the basis of said instantaneous vehicle position and said traveling direction;

means for detecting number of intersecting unit links connected to the forthcoming end of said unit traveling link;

means for calculating an intersecting angle at said forthcoming end of the said unit traveling link with said intersecting links; and means for displaying information concerning the curvature at the intersection of said links.

According to another aspect of the invention, an apparatus for providing guidance concerning road condition comprises:

means for detecting a unit traveling link among a plurality of unit links forming a link train in a road information on which a vehicle is traveling;

means for detecting an instantaneous position of the vehicle and a traveling direction of said vehicle;

means for calculating a distance from the instantaneous vehicle position to a forthcoming end of said unit traveling link on the basis of said instantaneous vehicle position and said traveling direction;

means for detecting the number of intersecting unit links connected to the forthcoming end of said unit link; and means for displaying information concerning intersecting condition of said unit link and said intersecting unit links at the intersection thereof.

According to a further aspect of the invention, a method for providing guidance concerning road condition, comprises the steps of:

detecting a unit link among a plurality of unit links forming a link train in a road information, on which a vehicle is traveling;

detecting an instantaneous position of the vehicle and a traveling direction of said vehicle;

calculating a distance from the instantaneous vehicle position to a forthcoming end of said unit link on the basis of said instantaneous vehicle position and said traveling direction;

detecting the number of intersecting unit links connected to the forthcoming end of said unit link;

calculating an intersecting angle at said forthcoming end of the said unit link with said intersecting unit links when said number of said intersecting unit links is one; and displaying information concerning curvature at the intersection of said links.

According to a still further aspect of the invention, a method for providing guidance concerning road condition, comprises the steps of:

detecting a unit traveling link among a plurality of unit links forming a link train in a road information, on which a vehicle is traveling;

detecting an instantaneous position of the vehicle and a traveling direction of said vehicle;

calculating a distance from the instantaneous vehicle position to a forthcoming end of said unit link on the basis of said instantaneous vehicle position and said traveling direction;

detecting a number of intersecting unit links connected to the forthcoming end of said unit link; and displaying information indicative of forthcoming intersection accompanying information concerning intersecting condition of said unit link and said intersecting unit links at the intersection thereof, when the number of said intersecting unit links is a plural.

According to another aspect of the present invention, there is provided an apparatus for providing guidance concerning a road condition, comprising;

means for detecting one of the unit traveling links comprising a link train in a road information, on which a vehicle is traveling;

means for detecting instantaneous position of the vehicle and a traveling direction of said vehicle on said unit link in said link train;

means for determining an end position of the last unit link of said link train positioned at a predetermined distance ahead of said instantaneous position of the vehicle;

means for detecting and calculating at least a number of intersecting unit links connected, an intersecting angle formed, and a curvature of at least one of said unit links connected, an end of each one of said unit links of said traveling link train;

means for displaying at least one of said information concerning at least one of the number of intersecting unit links connected, an intersecting angle formed between said unit link and adjacent unit link connected, and a curvature of a unit link connected to each one of the ends of said unit links in said link train, respectively, in an order in which each one of said unit links are arranged from said instantaneous position of the vehicle to said position of said predetermined distance ahead of said instantaneous position thereof.

According to the present invention, by utilizing a conventional navigation system, a calculating operation is carried out on the basis of information comprising an instantaneous position of a vehicle on a road, information of a map or the like, a current speed thereof and a moving direction thereof, to provide to a driver prospective information concerning the road condition, i.e., configuration of the curve or intersection, which may significantly contribute to the maintenance of a high level of safety during a drive through a winding road, mountainous road and other roads providing poor visibility, for example, driving at night. Furthermore, since the present invention provides information concerning the presence of the curve or intersection but also the configuration of the curve or the intersection, it allows the driver to adjust his driving behavior, including the vehicle speed, to the forthcoming curve or intersection.

BRIEF DESCRIPTION OF THE DRAWINGS

The present invention will be more fully understood from the detailed description given herein below and from the accompanying drawings of the preferred embodiment of the invention. Note that the specific embodiment is for the purpose of explanation and illustration only, and in no way limits the present invention.

DESCRIPTION OF THE PREFERRED EMBODIMENTS

The practical embodiment of the method and apparatus for the guidance of a road condition, according to the present invention, will be discussed herebelow with reference to the accompanying drawings.

Figure 1:
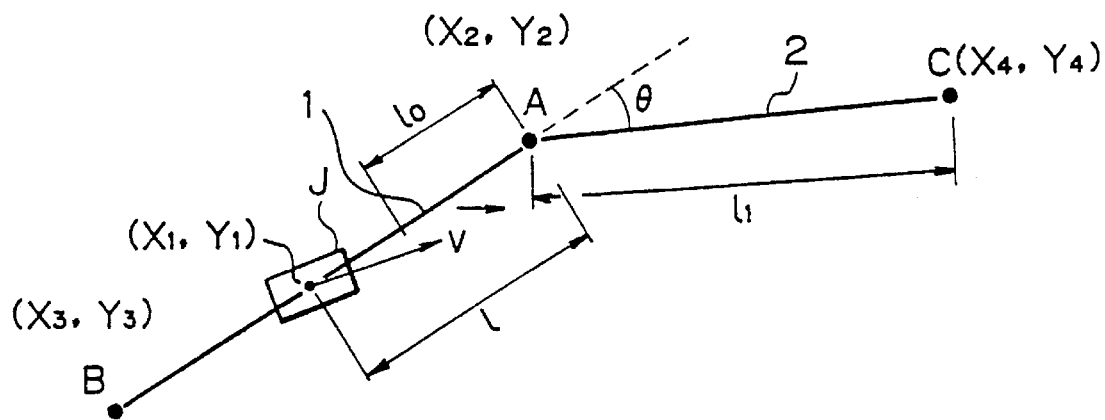
FIG. 1 is a diagrammatic illustration showing the principles of a method and an apparatus for guidance of a road condition according to the present invention.

Referring now to FIG. 1, there is illustrated a principle of the method and apparatus for guidance of the road condition according to one aspect of the invention. Basically, the present invention is formulated to detect an instantaneous position of a vehicle J by a vehicle position detecting means on unit links 1 and 2 of road information. In case of the shown state, the vehicle J is detected on the unit link 1. Also, it is detected that the vehicle J is traveling on the unit link 1 toward the unit link 2 by means of a traveling information detecting means.

For such vehicle position detecting means, navigation systems known in the art can be utilized. The detected instantaneous position of the vehicle J can be expressed by X, Y coordinate values on an X-Y coordinate system. Also, the traveling direction of the vehicle is derived on the basis of a traveling direction vector V from a traveling speed and a traveling direction detected by a speed sensor and an direction sensor.

Figure 6:
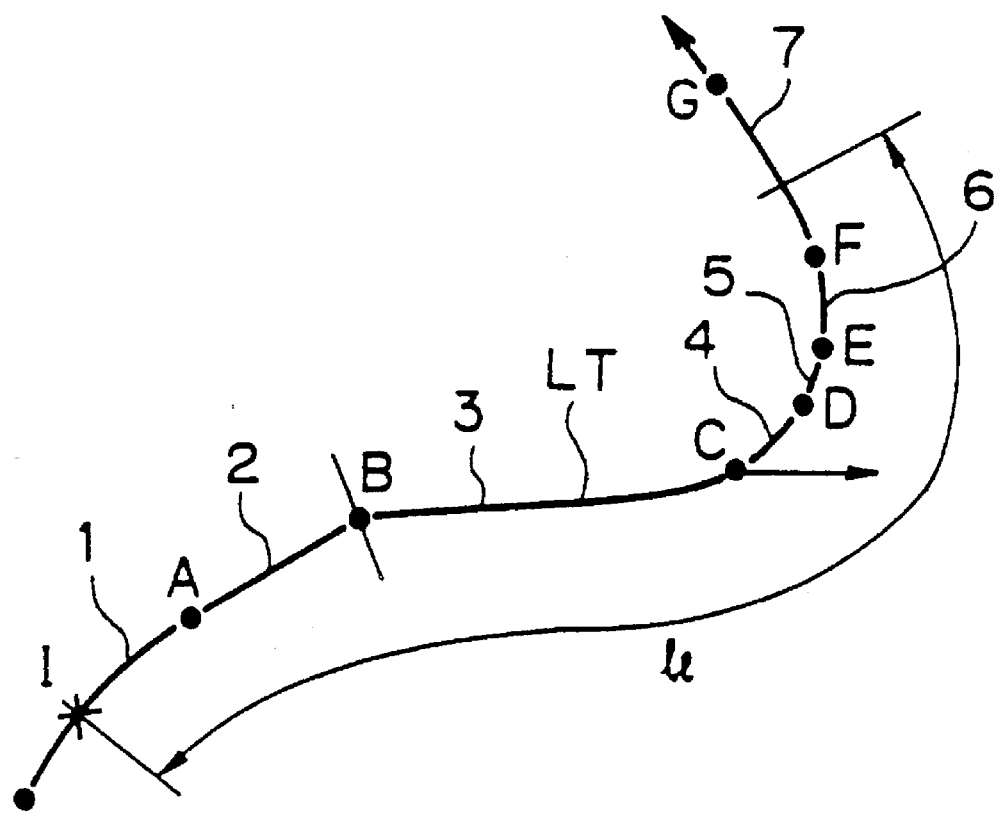
FIG. 6 illustrates a curvature configuration of a road condition based on a linear configuration.

In the present invention, all of the road information used in the navigation system is stored in a suitable memory such that each of the roads on which a vehicle is traveling, comprises a plurality of unit links serially connected to each other to form a link train and each one of the unit links has a configuration selected from a linear configuration of unit links and a curvature configuration as shown in FIG. 6.

Each end of the unit link forms a connecting point to which another adjacent unit link or plurality of the unit links having the same or different configurations as that of the unit link is connected.

Calculation of the instantaneous vehicle traveling direction is performed by comparing inner products of the vector $\vec{V} \cdot \vec{AB}$ and the vector $\vec{V} \cdot \vec{BA}$. On the other hand, the instantaneous traveling speed of the vehicle can be detected by means of a distance sensor and so forth using a vehicle speed pulse.

In the shown example, judgement can be made or it can be determined that the vehicle is traveling on the unit link 1 from the end B to the end A through the process set forth above.

Means for calculating a distance l shown in FIG. 1 from the instantaneous vehicle position $(X_1, Y_1)$ on the unit link 1 to the end A thereof, is provided for deriving the distance l. Here, the position $(X_2, Y_2)$ of the end A of the link 1 can be read out from the road database stored in the known navigation system.

Then, the distance l is compared with a predetermined distance $l_0$ for deriving a difference therebetween. When the distance l is greater than the predetermined distance $l_0$, it is determined that the instantaneous position of the vehicle is not close enough to display the condition of the road at the end A of the link 1, where the intersection or the curve exists. When said judgement is made, no information will be displayed on a display means. Note that the distance $l_0$ represents a distance at which a determination should be carried out to determine whether or not such information should be displayed.

On the other hand, when the distance l is shorter than the predetermined distance $l_0$, it is determined that the instantaneous position of the vehicle is close enough to the next intersection or curve at the end A of the link 1. When said judgement is made, information will be displayed on a display means.

There is no specific distance to set as the predetermined distance $l_0$ and $l_0$ can be set at any desired distance. For example, it can be set at 20 m ahead of the end A. In the alternative, the predetermined distance $l_0$ can be set as a variable value associated with the instantaneous traveling speed of the vehicle. In the latter case, the predetermined distance $l_0$ may be set long enough for stopping the vehicle corresponding to the instantaneous vehicle speed. For example, when the vehicle speed is 100 km/h, the predetermined distance $l_0$ may be set automatically at 100 m.

Next, in the present invention, a unit link end condition recognizing means is provided for detecting the end A of the link 1, to which the vehicle is approaching. The unit link end conditioning recognizing means detects the configuration of the forthcoming curve or intersection and thus detects the number of unit links connected to the end A of the link 1. The detection of the forthcoming end A of the link can be made using data of the road map stored in the known navigation system.

When a single additional unit link is connected to the end A of the unit link 1, the unit link end condition recognizing means determines that there is only a curve at the forthcoming end A of the unit link 1. A difference of directions of the unit link 1 and the unit link 2 connected to the end A and the intersecting angle therebetween are calculated by an arithmetic means. Based on the intersecting angle of the unit links 1 and 2, a curvature of the forthcoming curve can be predicted.

Based on the results of the above-mentioned arithmetic operation, discrimination is made whether the forthcoming curve is a left curve or a right curve, and whether the curve is tight or gradual. Then, according to the result of the discrimination, the configuration of the curve is displayed.

The curvature r1 or the difference of directions of the connected unit links of the present invention can be calculated utilizing the following equation (1);

$$\text{Curvature } r1 = k \cdot \frac{l_1}{|\theta_1|} \quad (1)$$

wherein k denotes a constant value and $l_1$ denotes a length of the unit link 2 connected to the end of the first unit link 1 and further $\theta_1$ denotes an intersecting angle formed between the first unit link 1 and the second unit link 2 as shown in FIG. 1.

Upon derivation of the difference of direction and the intersecting angle at the end A of the unit link 1, data of the road map recorded in the navigation system can be used. Namely, the directions of the unit links 1 and 2 can be derived from the coordinate positions of A and B at the ends of the unit link 1 and at the end C of the unit link 2.

Providing information concerning the forthcoming end of the unit link can be made in various ways. For example, it can be voice information for giving audible notice of the forthcoming intersection or curve. As an alternative, the notice can be given by a graphic display of the forthcoming intersection or the curve.

Figure 2:
FIG. 2 illustrates various graphic patterns of curve configurations of a road.

In a practical embodiment of the graphic display, curves are divided into a plurality of classes depending upon the curvature, curve direction and radius of the curve. With respect to each of the classes of the curves, mutually distinct graphic signs are given as shown in FIG. 2. Such graphic signs are stored in a table. The table is accessed in terms of the information of the magnitude of the curve angle and the sign thereof for reading out the corresponding graphic sign and for displaying the relevant graphic image on a visual display screen, such as a CRT.

From the display, the driver can obtain information such as "the forthcoming curve is a right hand curve and the curve is tight", or "the forthcoming curve is a left hand curve and the curvature is small or gradual, i.e., curve is not tight".

Figure 3:
FIG. 3 illustrates various graphic patterns of configurations of intersections.

In addition, according to the invention, for the graphic display of the configuration of the forthcoming curve or intersection as shown in FIGS. 2 and 3, audible information and color display technology can be combined for enhancing the information provided for the driver. For example, by changing the color of the display depending upon the tightness of the curve in the graphic images of FIG. 2, information concerning the road condition can be provided more effectively and accurately.

In addition, with the present invention, it is also possible to provide an alarm for overspeeding or excessive speeding prior to entering the curve. For enabling this feature, an optimal or an acceptable maximum vehicular traveling speed can be set with respect to the degree of the curvature through which the vehicle can pass smoothly and safely. Then, by comparing the instantaneous vehicular traveling speed with the optimal or the allowable maximum speed, the degree of danger can be recognized. Based on the recognized degree of danger at the forthcoming curve, an alarm can be provided requiring deceleration of the vehicle. For example, when the vehicle traveling speed is too high relative to the radius of the forthcoming curve, the display color can change to red for alerting the driver of overspeeding upon entry into the forthcoming curve. Also, in such a case, it is also possible to actuate a voice generating device for providing an audible signal, such as "slow down".

On the other hand, when a plurality of unit links are connected to the end A of the unit link 1, the unit link end condition recognizing means will determine that there is a forthcoming intersection to display the configuration of the intersection as shown in FIG. 3. It is also possible to combine the visual display showing the configuration of the intersection as shown in FIG. 3, with an audible information, such as "there is a forthcoming junction", "there is a forthcoming intersection", "intersection is approaching", "be careful" and so forth.

Figure 4:
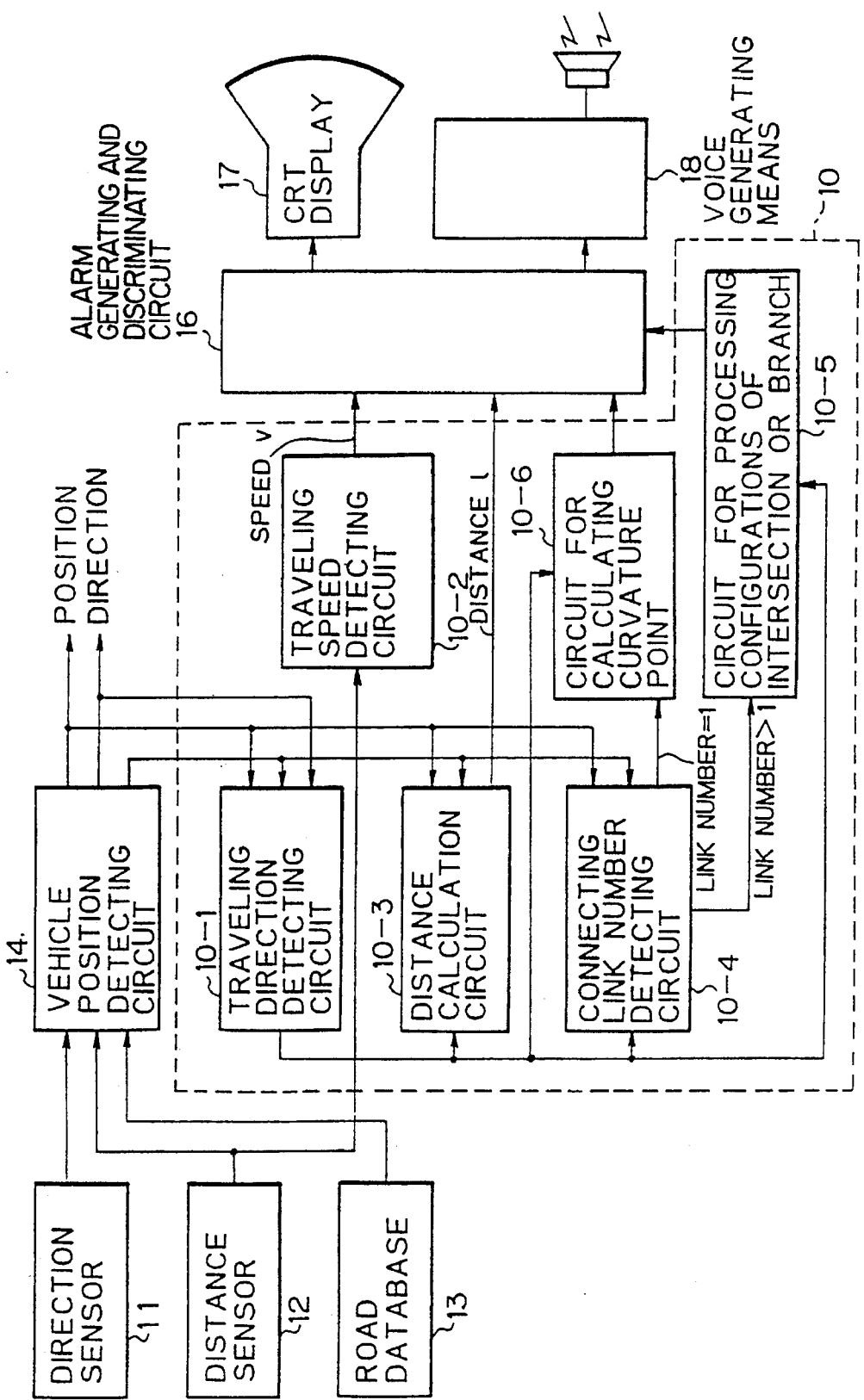
FIG. 4 is a schematic block diagram of a preferred embodiment of an apparatus for guidance of a road condition according to the present invention, used for implementing a preferred method according to the present invention.

FIG. 4 shows the preferred construction of the apparatus for offering guidance of the road condition according to the present invention.

The apparatus includes a direction sensor 11 for detecting the instantaneous vehicular traveling direction, and a distance sensor 12 for detecting vehicular traveling distance using the rotation pulse of a road wheel and a road database 13 in which road information data are stored in the same database utilized in the conventional navigation system.

The apparatus further includes a vehicle position detecting circuit 14 connected to outputs of each one of the direction sensor 11, the distance sensor 12 and the road database 13, respectively and outputting the positional information and the directional information, a process data generating circuit 10 and an alarm generating and discriminating circuit 16.

In the present invention, the process data generating circuit 10 of this apparatus comprises a traveling direction detecting circuit 10-1 for detecting traveling direction of the vehicle and connected to the output of the vehicle position detecting circuit 14, a traveling speed detecting circuit 10-2 for detecting the traveling speed of the vehicle and connected to the output of the distance sensor 12, a distance calculation circuit 10-3 for calculating a distance from the instantaneous vehicle position to the end of the unit link and connected to the output of the traveling direction detecting circuit 10-1 and the outputs of the vehicle position detecting circuit 14, a connecting number detecting circuit 10-4 for detecting the number of unit links connected to the forthcoming end of the unit link and connected to the output of the traveling direction detecting circuit 10-1 and the output of the vehicle position detecting circuit 14, a circuit 10-5 for detecting and processing a configuration of the intersection or the branch point including an intersection angle θ between the traveling unit link and the unit links connected to the forthcoming end, and the circuit connected to the output of the traveling direction detecting circuit 10-1 and the output of the circuit 10-4 and a circuit for calculating a curvature point 10-6 of the adjacent unit link connected to the end of the unit link and connected to the output of the traveling direction detecting circuit 10-1 and the output of the connecting link number detecting circuit 10-4.

The alarm generating and discriminating circuit 16 of the present invention receives information from the output of the traveling speed detecting circuit 10-2, the distance calculation circuit 10-3, the connecting link number detecting circuit 10-4 and the circuit 10-5, respectively and the output thereof is connected to CRT display 17 and a voice generating means 18.

In the alarm generating and discriminating circuit 16, a suitable arithmetic circuit (not shown) is provided and it may perform a predetermined process, such as recognition, judgement or comparative calculation for deriving information to be provided for the driver.

In the present invention, the predetermined distance $l_0$ by which whether or not the road information of the end of the unit link on which the vehicle is traveling is determined and displayed with respect to the distance 1 in FIG. 1 between the instantaneous position of the vehicle and the end position of the unit link, can be obtained by the following manner, for example;

When assuming the vehicle speed obtained from the traveling speed detecting circuit 10-2 is v(m/sec) and the display is intended to be carried out at a time 30 seconds before the vehicle reaches the end position of the unit link, then the calculation is carried out with the following equation;

$$l_0 = v \times 30 \ (m)$$

When the road to be traveled is crowded with vehicles (v=0) and since $l_0$=0 is an inadequate condition then the following equation is preferably used;

$$l_0 = \max (v \times 30, 30)$$

Note, that whichever is larger of v×30 m or 30 m, is utilized.

On the other hand, a discriminating method for determining whether the alarm display is required or not, on the basis of the curvature r1 of a forthcoming curve of the road and the present moving speed v of the vehicle, can be obtained, for example, as follows;

A dangerous ratio of the vehicle can be obtained by the equation $v^2/r1$ and when the dangerous ratio $v^2/r1 > K$, wherein K is constant, the alarm is displayed while when the dangerous ratio $v^2/r1 < K$, the alarm is not displayed.

The results of the arithmetic operations in the arithmetic circuit may be displayed on a CRT display 17 and audibly provided from a voice generating means 18, through an alarm circuit 16. Therefore, the driver can realize the forthcoming intersection or curve with the configuration thereof, in advance.

Figure 5:
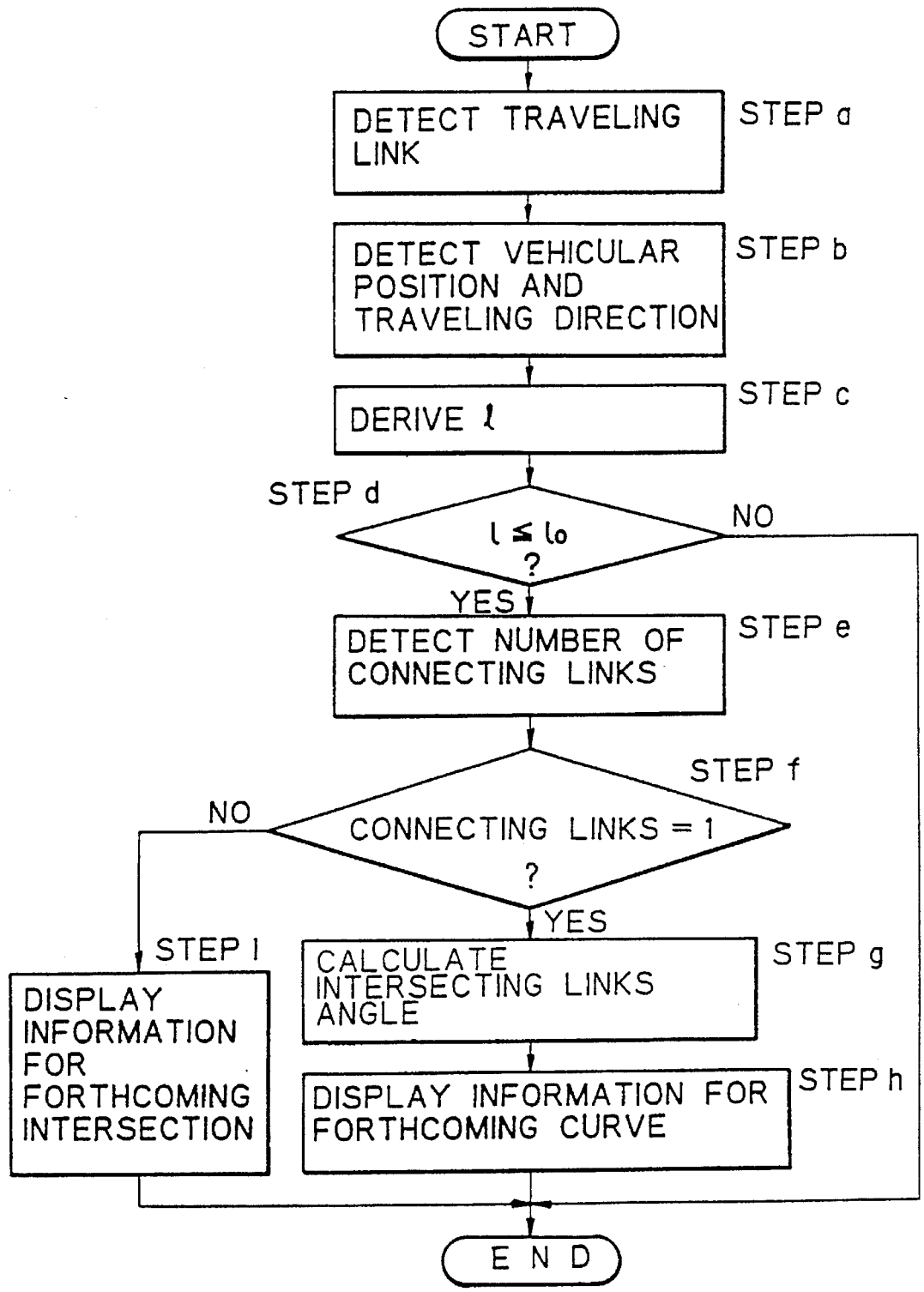
FIG. 5 is a flowchart of a process for implementing the preferred embodiment of the method for guidance of the road condition according to the present invention.

FIG. 5 is a flowchart showing a practical process for providing guidance for the driver concerning the road condition, according to the present invention.

At first, immediately after starting the process, one of the unit links in the road information, on which the vehicle is traveling is detected at a step a. Subsequently, at a step b, in the manner set forth above, the instantaneous vehicle position on the unit link and the traveling direction along the unit link is detected. Then, from the information of the instantaneous vehicle position and the traveling direction, the distance l from the instantaneous vehicle position to the forthcoming end of the unit link is arithmetically derived, at a step c. Thereafter, the distance l obtained in the process at the step c is compared with the predetermined distance $l_0$ to determine whether the information is to be displayed or not in view of the vehicle position relative to the forthcoming end of the unit link, at a step d. when the distance l is greater than the predetermined distance $l_0$ as checked at the step d, the process goes directly to END since it can be determined that the vehicle is too far from the end of a unit link to display the information. On the other hand, when the distance l is smaller than or equal to the predetermined distance $l_0$, it is determined that display of the information is necessary. Then, the process is advances to a step e. At the step e, the number of unit links connected to the end of the traveling unit link, in which the vehicle is traveling, is detected.

Then, a check is made to determine whether the single unit link is connected or not, so as to discriminate the type of the end of the traveling unit link, either the curve or intersection, at a step f. When the number of connected unit links is one, the intersecting angle of the unit links is calculated at a step g. Subsequently, at a step h, information concerning the presence of the curve and the curvature thereof is displayed as a signal of caution for the driver. As an option, it is possible to provide an alarm for the driver for over or excessive speeding in view of the curvature of the forthcoming curve and the instantaneous traveling speed.

On the other hand, when a plurality of unit links connected to the traveling unit link are detected at the step f, it can be determined that the forthcoming end of the unit link is the intersection. Then, at a step i, the information concerning the presence of the intersection as well as the configuration of the forthcoming intersection is displaced.

In the embodiments as explained above, only the road information concerning the condition at the end of a unit link on which the vehicle is traveling, is processed and displayed. However, the present invention is also able to utilize total road information generated from a plurality of individual units of information from each one of the unit links serially connected to each other forming a link train on which the vehicle is traveling, by processing them in a suitable data processing circuit. Such an aspect of the present invention will be explained hereunder.

In accordance with this, there is provided an apparatus for offering guidance concerning a road condition, comprising a means for detecting one of the unit traveling links comprising a link train in a road information on which a vehicle is traveling; a means for detecting an instantaneous position of the vehicle and traveling direction of the vehicle on the unit link in the link train; means for determining an end position of the last unit link of the link train positioned at a predetermined distance ahead of the instantaneous position of the vehicle; and a means for detecting and calculating at least a number of intersecting unit links connected, an intersecting angle formed, and a curvature of at least one of the unit links connected to an end of each one of the unit links of the traveling link train. Further, the apparatus includes a means for displaying at least one of the information units concerning or indicating at least one of the number of intersecting unit links connected, an intersecting angle formed between the unit link and adjacent unit link connected, and a curvature of a unit link connected to each one of the ends of the unit links in the link train, respectively, in an order in which each one of the unit links are arranged from the instantaneous position I of the vehicle to the position of the predetermined distance ahead of the instantaneous position thereof.

In this respect, a plurality of information about the road condition at each end point of the respective unit links serially connected to form a link train as shown in FIG. 6, are taken in a group to be processed and thereby provide more detailed and suitable road information to the driver at a suitable time.

Note, that the FIG. 6 shows one example of a road condition on which the vehicle will pass through hereafter, in which a plurality of the unit links 1 to 7 are serially connected to form one link train LT, and the road conditions at each one of the end positions (A to F) of respective unit links 1 to 6 are simultaneously stored in a suitable data processing means.

And in this situation, when the instantaneous position of the vehicle exists at point I on the link train LT, a position of a predetermined discriminating point P existing at a predetermined distance ahead of the instantaneous position I of the vehicle, and then a plurality of conditions about each one of the end positions (A to F) of respective unit links that falls into the range of the link train LT between the instantaneous position I of the vehicle and the position and the predetermined distance ahead of the instantaneous position I thereof, are obtained.

The predetermined distance is not restricted to a special critical figure but it may be desirably determined with respect to a road condition and the accuracy of the information is obtained from the system and the road information already stored in the memory or the like.

Note, that in this aspect of the present invention, the length 1 of each one of the unit links shown in FIG. 1 is relatively shorter than that of the predetermined distance and each unit of information concerning the road condition of the end portion is sequentially displayed in the order at which they are arranged.

Namely, the information concerning the road condition at the end portion A of the first unit link 1 is first displayed closest to the end portion of the instantaneous position I of the vehicle and is the same at the end portion B of the second unit link 2 next closest end portion thereto, is displayed thereafter and so on.

In this aspect, the curvature can be calculated utilizing the following equation (2) with respect to the link train LT;

$$\text{Curvature } r1 = k \cdot \frac{L_A}{|\theta_A|} \quad (2)$$

wherein k denotes a constant value and $L_A$ denotes a total length of each one of the unit link $1_i$, i.e., $L_A = \Sigma 1_i$ and $\theta_A$ denotes a total intersection angle of each one of the intersecting angle $\theta_i$, i.e., $\theta_A = \Sigma \theta_i$.

In this respect, the link train is defined as follows;

(1) The link train comprises a plurality of unit links i each connected to one end of a previous unit link locating or indicating the vehicle moving direction;

(2) In the link train, reference of the intersecting angle formed by the adjacent two unit links is never changed, (the reference representing a clockwise curve, i.e., negative curve or counter-clockwise curve, i.e., positive curve); and (3) An absolute value of the intersecting angle of the unit links formed at each end thereof necessarily exceeds a predetermined value $\theta_0$.

The discriminating process to determine the curvature will be explained with reference to the FIG. 7, hereunder.

Figure 7:
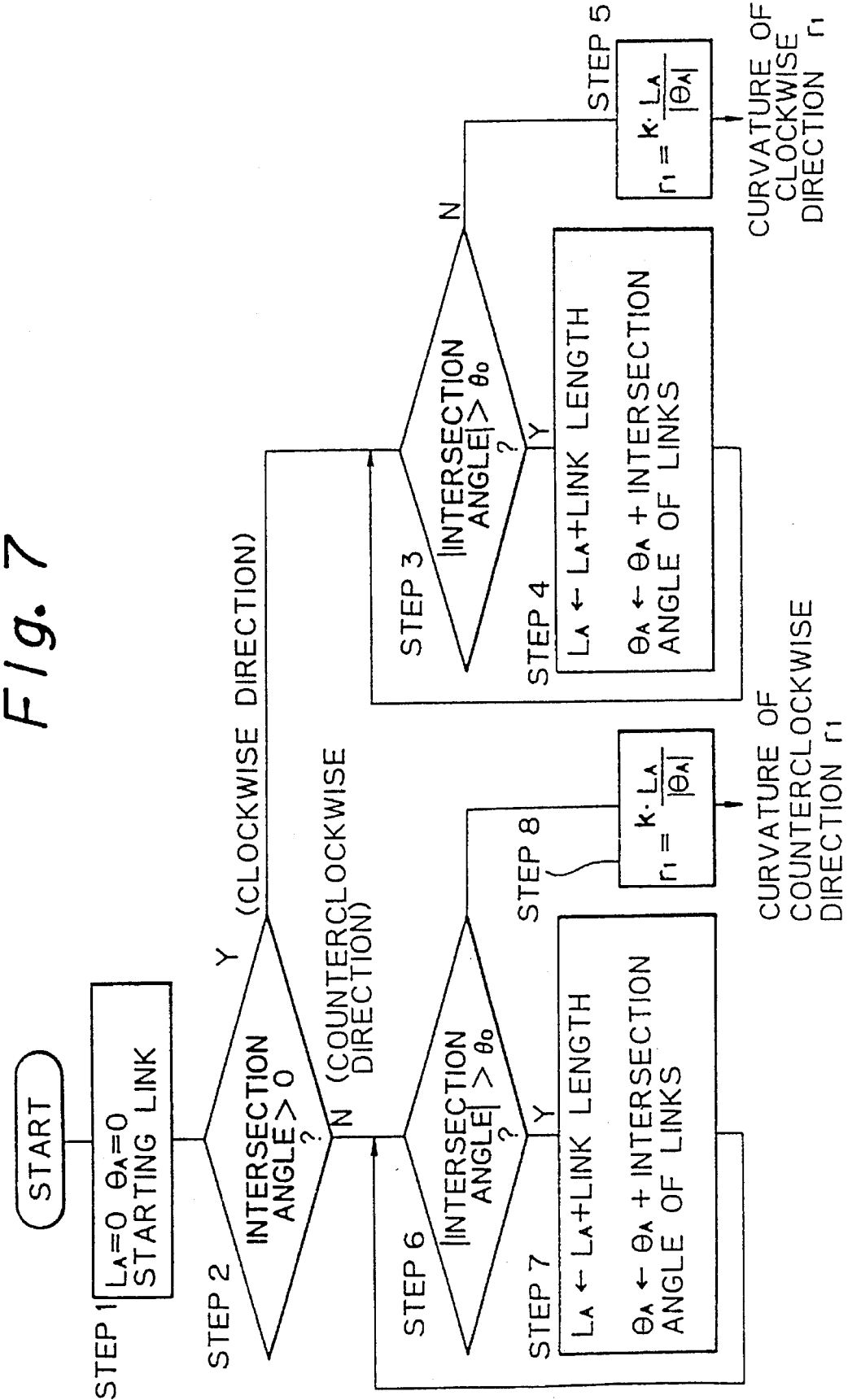
FIG. 7 is a flow chart for processing the curvature configuration and initializing all data stored in memory.

FIG. 7 shows a flow chart for processing the curvature in the present invention, and when the system is started, all data stored in a memory are initialized. (step 1)

In step 2, an intersecting angle formed between the unit links is calculated and if the detected intersecting angle exceeds 0, i.e., and reads YES, then the process advances to step 3 and determines whether the absolute intersecting angle exceeds $\theta_0$ or not.

If the absolute intersecting angle exceeds $\theta_0$ and reads YES at the step 3, then the process advances to step 4 and the total unit links $L_A$ is changed to $L_A$+the length of a new unit link connected to the end of the unit link and the total intersecting angle $\theta_A$ is changed to $\theta_A$+the intersecting angle newly detected and then the process returns to the step 3 and detects the same information of the next unit link and repeats the same operation.

On the other hand, if the absolute intersecting angle shows below $\theta_0$ and NO at the step 3, then the process advances to step 5 and a curvature in a counter-clockwise direction r1 is calculated in accordance with the equation (2) as shown above.

In the step 2, if the detected intersecting angle does not exceed 0, i.e., NO, then the process advances to step 6 and determines whether the absolute intersecting angle exceeds $\theta_0$ or not.

If the absolute intersecting angle exceeds $\theta_0$ and reads YES at the step 6, then the process advances to step 7 and the total unit links $L_A$ is changed to $L_A$+the length of a new unit link connected to the end of the unit link, and the total intersecting angle $\theta_A$ is changed to $\theta_A$+the intersecting angle newly detected. The process returns to the step 6 and detects the same information of the next unit link and repeats the same operation.

On the other hand, if the absolute intersecting angle shows below $\theta_0$ and reads NO at the step 6, then the process advances to step 8 and a curvature in a clockwise wise direction r1 is calculated in accordance with the equation (2) as shown above.

As set forth above, the present invention can fulfill all of the objects and advantages sought therefor. Particularly, since the present invention can provide prospective information concerning the road condition, i.e., configuration of the curve or intersection, it may significantly contribute to the maintenance of a high level of safety during a drive through a winding road, mountainous road and other roads providing poor visibility for the driver. Furthermore, since the present invention provides information concerning the presence of the curve or intersection but also the configuration of the curve or the intersection, it may allow the driver to adjust his driving behavior, including the vehicle speed, to the forthcoming curve or intersection.

Although the present invention has been disclosed in terms of the preferred embodiment of the invention, the invention can be embodied in various ways and arrangement and thus should be understood that all of the embodiments and/or modifications that can be implemented without departing from the principle of the invention set out in the appended claims, should be regarded as within a scope of the present invention.

We claim:

1. An apparatus for providing guidance concerning a road condition, comprising:

a direction sensor for detecting a unit link having a forthcoming end among a plurality of unit links included in road information, on which a vehicle is traveling;

a direction detecting circuit, operatively connected to said direction sensor, for detecting an instantaneous position of the vehicle and a traveling direction of the vehicle;

a distance calculating circuit, operatively connected to said direction detecting circuit, for calculating a distance form the instantaneous position to the forthcoming end of said unit link using said instantaneous position and said traveling direction;

a number detecting circuit, operatively connected to said direction detecting circuit, for detecting a number of intersecting unit links connected to the forthcoming end of said unit link at an intersection;

an intersection calculating circuit, operatively connected to said direction detecting circuit and said number detecting circuit, for calculating an intersecting angle at said forthcoming end of the said unit link with said intersecting unit links, one end of which connects to another end of another adjacently arranged link to thereby represent a road; and a display circuit, operatively connected to said intersection calculating circuit and said distance calculating circuit, for displaying information concerning a curvature at the intersection of said intersecting unit links and the forthcoming end of said unit link as the road condition.

2. An apparatus for providing guidance concerning a road condition, comprising:

first detecting means for detecting a unit link, having a forthcoming end among a plurality of unit links included in road information, on which a vehicle is traveling;

a direction detecting circuit, operatively connected to said first detecting means, for detecting an instantaneous position of the vehicle and a traveling direction of said vehicle;

a distance calculating circuit, operatively connected to said direction detecting circuit, for calculating a distance from the instantaneous vehicle position to the forthcoming end of said unit links using said instantaneous position and said traveling direction;

a number detecting circuit, operatively connected to said direction detecting circuit, for detecting a number of intersecting unit links connected to the forthcoming end of said unit link at an intersection; and a display circuit, operatively connected to said first detecting means, said distance calculating circuit and said number detecting circuit, for displaying information concerning an intersecting condition of each of said unit links and said intersecting links at the intersection as a road condition.

3. An apparatus as set forth in claim 2, wherein said information is displayed as a graphic pattern representing the road condition of said intersection.

4. An apparatus for providing guidance concerning a road condition, comprising:

a direction sensor for detecting a unit link, having a forthcoming end among a plurality of unit links included in road information, on which a vehicle is traveling;

a direction detecting circuit, operatively connected to said direction sensor, for detecting an instantaneous position of the vehicle and a traveling direction of the vehicle;

a distance calculating circuit, operatively connected to said direction detecting circuit, for calculating a distance from the instantaneous vehicle position to the forthcoming end of said unit link using said instantaneous position and said traveling direction;

a number detecting circuit, operatively connected to said direction detecting circuit, for detecting a number of intersecting unit links connected to the forthcoming end of said unit link;

an intersecting calculating circuit, operatively connected to said direction detecting circuit and said number detecting circuit, for calculating an intersecting angle at said forthcoming end of said unit link with said intersecting unit links;

speed detecting means, operatively connected to said direction sensor, for detecting an instantaneous traveling speed of the vehicle;

discriminating means, operatively connected to said intersection calculating circuit, said speed detecting means and said distance calculating circuit, for discriminating a degree of danger using the instantaneous traveling speed of the vehicle and said intersecting angle and for providing an alarm to a driver; and display means, operatively connected to said discriminating means, for displaying information concerning the intersecting angles at an intersection of said intersecting unit links and the forthcoming end of said unit link as the road condition.

5. An apparatus as set forth in claim 4, wherein said information is displayed as a graphic pattern representing the road condition of said intersection.

6. An apparatus as set forth in claim 4, wherein said discriminating means generates at least one of an alarm using a graphic alarm display and an audible alarm.

7. A method for providing guidance concerning a road condition, comprising the steps of:

(a) detecting a unit link having a forthcoming end among a plurality of unit links included in road information, on which a vehicle is traveling;

(b) detecting, with a direction detecting circuit, an instantaneous position of the vehicle and a traveling direction of said vehicle;

(c) calculating a distance from the instantaneous vehicle position to the forthcoming end of said unit link using said instantaneous vehicle position and said traveling direction;

(d) detecting, with a number detecting circuit, a number of intersection unit links connected to the forthcoming end of said unit link at an intersection;

(e) calculating, with an intersection calculating circuit, an intersecting angle at the forthcoming end of said unit link, formed between said unit and another unit link connected to the end of said unit link, when said detected number of said intersection unit links is one; and (f) displaying information concerning the intersecting angle at the intersection of said intersecting unit links and the forthcoming end of said unit link as the road condition.

8. A method as set forth in claim 7, which further comprises a step of discriminating a degree of danger using an instantaneous traveling speed of the vehicle and said intersecting angle for providing an alarm to a driver.

9. A method for providing guidance concerning a road condition, comprising the steps of:

(a) detecting a unit link having a forthcoming end among a plurality of unit links included in road information, on which a vehicle is traveling;

(b) detecting, with a direction detecting circuit, an instantaneous position of the vehicle and a traveling direction of said vehicle;

(c) calculating a distance from the instantaneous vehicle position to the forthcoming end of said unit link using said instantaneous vehicle position and said traveling direction;

(d) detecting, with a number detecting circuit, a number of intersecting unit links connected to the forthcoming end of said unit link at an intersection when a distance from the instantaneous vehicle position to the forthcoming end of the unit link becomes less than a predetermined distance; and (e) displaying information indicative of the forthcoming end of said unit link at an intersection together with information concerning an intersecting condition of said unit link when the detected number of said intersecting unit links is greater than one as the road condition.

10. An apparatus for providing guidance concerning a road condition, comprising:

first detecting means for detecting one of a plurality of unit links, each of said unit links having an end and including an adjacent unit link and a last unit link and forming a link train included in road information, on which a vehicle is traveling;

a direction detecting circuit, operatively connected to said first detecting means, for detecting an instantaneous position of the vehicle and a traveling direction of the vehicle on said one of said unit links in said link train;

a determining circuit, operatively connected to said direction detecting circuit, for determining an end position of the last unit link of said link train positioned in a place located at a predetermined distance ahead of said instantaneous position of the vehicle;

a number detecting circuit, operatively connected to said determining circuit, for detecting and calculating at least a number of the unit links intersecting and connected to said one of said unit links, an intersecting angle formed between said one of said unit links and the adjacent unit link, and a curvature of at least said one of said unit links connected to the end of each of said unit links of said traveling link train;

a display circuit, operatively connected to said number detecting circuit, for displaying at least one of the number of said unit links, the intersecting angle formed between said one of said unit links and the adjacent unit link, and the curvature of said one of said unit links connected to the end of each of said unit links in said link train, respectively, in an order in which each of said unit links are arranged from said instantaneous position of the vehicle to said predetermined distance ahead of said instantaneous position.

11. An apparatus for providing road information relating to an oncoming road condition, comprising:

a sensor detecting and outputting information of a vehicle travelling at a speed and located at a distance from the oncoming road condition;

process data generating means for generating the road information using the information received from said sensor including the speed and the distance of the vehicle and a configuration of the oncoming road condition utilizing a curvature condition information obtained by calculating an intersectional cycle formed between at least two links which comprises a road and an end of the road which are connected to each other; and a display circuit displaying the road information received from said process data generating means.

12. An apparatus as set forth in claim 11, further comprising an alarm generator and discriminator circuit, connected between said process data generating means and said display circuit determining when the road information is to be received and displayed by said display circuit.

13. A method for providing road information relating to an oncoming road condition, comprising:

(a) detecting information of a vehicle traveling at a speed and located at a distance from the oncoming road condition;

(b) generating the road information including the speed and the distance of the vehicle detected in said detecting step a) and a configuration of the oncoming road condition utilizing a curvature condition information obtained by calculating an intersectional angle formed between at least two links which comprises a road and an end of the road which are connected to each other; and (c) displaying the road information.

14. A method as set forth in claim 13, further comprising the step of determining when the road information is to be displayed by said display circuit.

* * * * *

UNITED STATES PATENT AND TRADEMARK OFFICE
CERTIFICATE OF CORRECTION

PATENT NO. : 5,465,089
DATED : Nov. 7, 1995
INVENTOR(S) : NAKATANI et al.

It is certified that error appears in the above-indentified patent and that said Letters Patent is hereby corrected as shown below:

Col. 1,    line 50, after "train" delete ",".

Col. 4,    line 25, after "configuration" insert --of unit links--;
          line 41, change "distance 1" to --distance $\ell$--;
          line 44, change "1." to --$\ell$.--;
          line 47, change "distance 1" to --distance $\ell$--;
          line 48, change "distance $1_o$" to --distance $\ell_o$--;
          line 49, change "distance 1" to --distance $\ell$--; and change "distance $1_o$" to --distance $\ell_o$--;
          line 54, change "distance $1_o$" to --distance $\ell_o$--;
          line 58, change "distance 1" to --distance $\ell$--;
          line 59, change "distance $1_o$" to --distance $\ell_o$--;
          line 65, change "distance $1_o$ and $1_o$" to --distance $\ell_o$ and $\ell_o$--.

Col. 5,    line 1, change "distance $1_o$" to --distance $\ell_o$--;
          line 4, change "distance $1_o$" to --distance $\ell_o$--;
          line 7, change "distance $1_o$" to --distance $\ell_o$--.

Col. 8,    line 5, change "distance 1" to --distance $\ell$--;
          line 7, change "distance 1" to --distance $\ell$--;
          line 8, change "distance $1_o$" to --distance $\ell_o$--;
          line 11, change "distance 1" to --distance $\ell$--;
          line 12, change "distance $1_o$" to --distance $\ell_o$--;
          line 16, change "distance 1" to --distance $\ell$--;
          line 17, change "distance $1_o$" to --distance $\ell_o$--;
          line 18, delete "is" (second occurrence).

UNITED STATES PATENT AND TRADEMARK OFFICE
CERTIFICATE OF CORRECTION

PATENT NO. : 5,465,089
DATED : Nov. 7, 1995
INVENTOR(S) : NAKATANI et al.

It is certified that error appears in the above-indentified patent and that said Letters Patent is hereby corrected as shown below:

Col. 9,  line 30, after "condition" insert --,--.

Col. 10, line 38, delete "wise".

Col. 11, line 8 (Claim 1, line 12), change "form" to --from--.

Signed and Sealed this

Twenty-third Day of July, 1996

Attest:

BRUCE LEHMAN

Attesting Officer

Commissioner of Patents and Trademarks